April 11, 1967     M. ACHNER     3,313,916

PORTABLE PERSPIRATION APPARATUS

Filed Dec. 7, 1964     3 Sheets-Sheet 1

INVENTOR.
MARTIN ACHNER
BY
Woodhams, Blanchard and Flynn
ATTORNEYS

April 11, 1967 — M. ACHNER — 3,313,916
PORTABLE PERSPIRATION APPARATUS
Filed Dec. 7, 1964 — 3 Sheets-Sheet 2
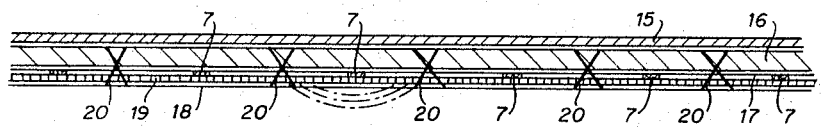
Fig. 2
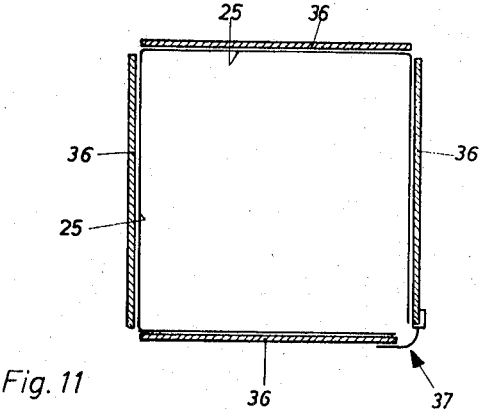
Fig. 11
Fig. 12
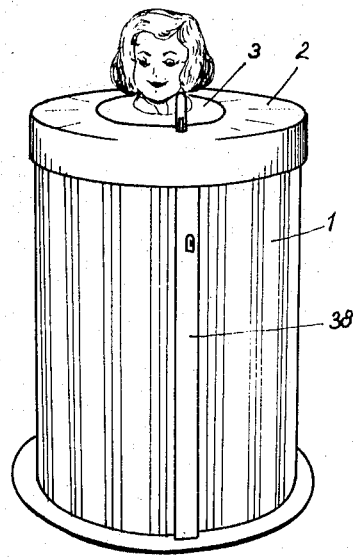
Fig. 7
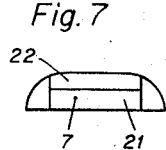
INVENTOR.
MARTIN ACHNER
BY
Woodhams, Blanchard & Flynn
ATTORNEYS April 11, 1967 M. ACHNER 3,313,916
PORTABLE PERSPIRATION APPARATUS
Filed Dec. 7, 1964 3 Sheets-Sheet 3

INVENTOR.
MARTIN ACHNER
BY
Woodhams, Blanchard & Flynn
ATTORNEYS

United States Patent Office 3,313,916
Patented Apr. 11, 1967

---

3,313,916
PORTABLE PERSPIRATION APPARATUS
Martin Achner, Burgstrasse 21, Garmisch-Partenkirchen, Germany
Filed Dec. 7, 1964, Ser. No. 416,271
Claims priority, application Germany, Dec. 12, 1963,
A 44,781; Aug. 19, 1964, A 46,889
10 Claims. (Cl. 219—385)

The invention concerns a portable perspiration apparatus comprising a cabinet with collapsible walls and an electrical heater.

The first known portable perspiration devices were heated by means of steam. The reason for this was that steam could be easily produced and it provided sufficient heat to warm a human body to the perspiration point.

For this reason, it is desirable to provide for the warming of a human body in a perspiration cabinet by other means wherein the air in the cabinet remains at least substantially dry. For such warming an electric infrared ray heater is effective. This involves, however, certain difficulties such as that the direct radiation of a human body by means of infrared rays leads to localized warming which, in order to conduct a sufficient quantity of heat to a human body to effect the outbreak of perspiration, may often approach the limit of the subject's endurance.

Somewhat better results would be obtained if the radiating heat rays, orginating from an infrared generator built into a chair would not be projected directly onto the subject's body but would be directed by means of a reflective wall covering of the cabinet onto the body. In this manner, there is accomplished an equally effective warming effect but in which localized occurrences of overheating are minimized in spite of the source of heating itself being at a high temperature in order to provide the necessary total quantity of heat. In order to avoid the danger that the wall covering can thereby possibly burn the user's skin, a very thin aluminum foil is used as the wall covering wherein the capacity for absorbing heat is sufficiently limited that the aluminum foil itself can not contain any appreciable amount of heat. Nevertheless, in such instance the electrical heat source must still reach a very high temperature and must be constructed in a special manner.

The purpose of the invention is to provide a perspiration apparatus in which by the use of simple means a quite uniform transfer of heat to the human body is rendered possible.

For the accomplishment of this purpose, the invention contemplates that the inwardly directed surface of the cabinet wall is constructed as a heating surface.

By this arrangement, a surprising operation is obtained, namely, that because of the heating rays coming uniformly from all sides onto the subject's body, the temperature of the cabinet walls can be held sufficiently low that no danger at all exists for the patient in the event that he should touch the wall. This is particularly surprising since in most infrared generators used up to now there must be provided a temperature of some 100 degrees Fahrenheit of the atmosphere inside the cabinet in order that the desired perspiration point can be reached. Equally surprising is the fact developed out of the use of the new perspiration apparatus that with it the outbreak of perspiration occurs in a shorter time than when previously known perspiration apparatuses have been used and yet a lesser electrical input is needed than previously. Infrared generators built into chairs up to the present utilize, for example, a power of around 1500 watts, at least about 1000 watts, the same being usually required in order to reach the point at which perspiration occurs. In the present cabinet, on the other hand, there is utilized in the present installations, around 700 watts. However, it must obviously be taken into account that the perspiration point with respect to the actual quantity of applied heat varies from individual to individual. A very important advantage of the present apparatus with respect to the previously known perspiration apparatus is obtained through the presently described invention in that the apparatus consists for all practical purposes only of the cabinet walls. Any kind of supplementary heating bodies are entirely unnecessary. This is not only of scientifically great importance but also relates to the space requirements of the portable perspiration apparatus. Particularly in comparison with the apparatus of the invention, the shipment of the heaters used up to the present time has been excessively costly. The surface heating can be made of electrical heating elements.

In order to provide in a simple manner for an especially uniform distribution of heat over the inner side of the cabinet walls, the inwardly directed surface of the cabinet wall is provided, according to the invention, with a very good heat conductive covering, such as a metal foil, which distributes the heat developed by the heating elements uniformly to all of the inwardly directed surface of the cabinet walls. In this manner, a large quantity of heat can be distributed to the inner surface of the cabinet wall with a minimum of loss. In such cabinet wall, the covering comprises two sheets of metal between which is arranged a hollow space for the heating elements. The outer metal sheet of the covering which is adjacent the cabinet wall thus reflects the heat rays. The second metal sheet, which is arranged to face inwardly, is preferably provided with a thin reinforcing layer, for example, one made of a textile material or the like, so that the heat reflected by means of the first metal sheet will be absorbed by this textile layer and the heat thereby accumulated will be further conducted through the second metal sheet.

An especially simple connection of the metal sheets is provided in that these sheets are connected to each other by seams running parallel to the heating elements, said seams being formed while the metal sheets lie flat.

When a covering of this kind, comprising two metal sheets connected at a plurality of spaced parallel seams is bent into a curved form, the radially inwardly facing metal sheet at points between the seams is raised a small amount away from the metal sheet lying immediately behind same and there is thus provided the above-described hollow space. This is preferably carried out in such a manner that if a supporting layer of heat insulative material, for example, paperboard, is fastened at intervals to the radially outer surface of the outer metal sheet, upon the bending of the cabinet wall there is brought about a greater shortening of the inner metal sheet so that the vertical strips of metal sheets running between successive seams of the wall appear in cross section to provide a somewhat loop-shaped pattern.

Inasmuch as the covering consists of metal layers, the radiation of this covering can be considerably improved if the metal surface constituting the inner surface of the inner cabinet wall is covered with an effective heat emitting material, for example, plastic.

An especially simple construction of the cabinet is obtained if the cabinet wall consists of a plurality of vertically arranged strips of staves of wood or plastic which are bonded together and located to face inwardly of the cabinet and the heating elements are located in grooves or hollow spaces within these strips.

In the use of strips or staves made from plastic and presenting a hollow section, it is especially useful if the section consists of a chamber directed inwardly of the cabinet and arranged for reception of the heater and further if said strips include at least a further chamber located outwardly of the cabinet. In this manner, it is assured for the purpose of avoiding undesired heat loss, that only the inner surface of the cabinet wall will be heated.

Further, in this manner an especially simple but effective manner of heat transfer is assured in that hollow spaces containing a heater are associated with the interior of the cabinet by openings thereinto. These hollow spaces constitute a chimney in which the warm air moves upwardly so that they include at the upper end an air exit and at the lower end an air entrance. Obviously, this is not only possible with tubular plastic material but also with a coating which consists of metal sheets providing therebetween a hollow space for the heating element.

In order that the heating elements can without extra expense be secured against contacting of same, an elastic protective rim can be applied to the ends of the staves. The heating elements which are associated with the several staves are connected by electrical connecting portions housed in said rims.

Further, it is of considerable value in assuring maximum safety in the use of the perspiration cabinet if each heat conductor is enclosed in plastic. For example, the heating elements may be made from a wire or band coated with a plastic material, for example, a silicone or an epoxy.

An especially simple manner of building a perspriation cabinet can be obtained wherein the cabinet consists of an outwardly facing heat insulative wall and a heat conductive sheet at least partially covering the inner surface of this wall. In this manner, there is accomplished in a simple manner a fully uniform heating of the inner surface of the cabinet wall.

In order on the one hand to make the heat conductive layer very flexible and on the other hand to make it very strong, the heating layer consists of a thin, electrically conductive sheet, for example, one made from graphite or other high electrical resistance material of which both sides are protected with a flexible plastic sheet. An example of the invention is set forth in the drawings in which:

FIGURE 2 is a fragmentary enlarged horizontal section through a cabinet wall substantially as taken on the line II—II of FIGURE 1.

FIGURE 7 is a view similar to a portion of FIGURE 5 and showing another modification.

FIGURE 11 is a horizontal partial section through a perspiration cabinet of another form.

FIGURE 12 is a perspective view of a perspiration cabinet according to FIGURE 1 shown in a position of use.

Figure 1:
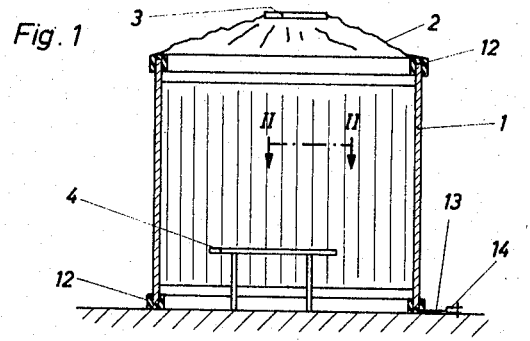
FIGURE 1 is a vertical central cross-sectional view through a schematically shown perspiration cabinet.

The collapsible, portable perspiration cabinet set forth in FIGURE 1 includes a cabinet wall 1. The cabinet can be closed by a flexible hood 2 provided with a head opening 3. Within said cabinet there is provided an appropriate seating device 4, for example, a stool. The cabinet can be closed by means of a bar 38 (FIGURE 12).

In FIGURE 2 there is set forth a first embodiment of the cabinet wall in a stretched out, flat position and on an enlarged scale. A plastic protective layer or sheet 15, is glued on a heat insulative layer or sheet 16, for example, of paperboard or the like. The paperboard serves on its inner side as a carrier for a metal foil or layer 17. A further very thin metal foil or layer 18, which is less than 0.3 mm. in thickness, faces inwardly of the cabinet and is plated or condensed from a vapor on a carrier layer 19, for example, of gauze or similar fabric. Between the metal foils 17 and 18 are arranged the vertically running heating elements or heat conductors 7 suitably spaced from each other.

The heat insulative paperboard layer 16 is fastened to the inner metal foil 18 and the carrier layer 19 through the seams 20. These seams 20 are parallel to the vertically running heat conductors 7 and are of such a spacing that a heat conductor 7 can be arranged respectively between each of them. When a cabinet wall is brought into a curved position, the metal foil 18 with the carrier layer 19 becomes raised radially somewhat from the neighboring metal foil 17 somewhat as set forth in broken lines in FIGURE 2. In this manner, the perspiration cabinet is retained in a somewhat cylindrical form. The metal foil 17 is appropriately glued or condensed from a vapor onto the heat insulative layer or sheet 16. The metal layer 18 and its carrier sheet 19 can be provided with openings at the upper and lower ends between the seams 20 in order to transmit heat not only radiantly but also by convection.

Figure 3:
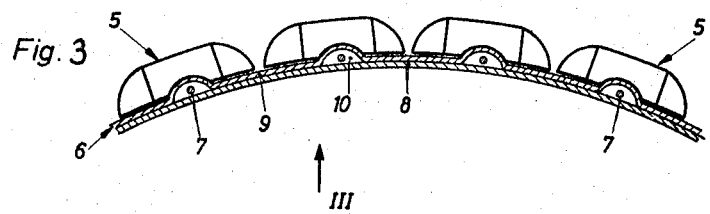
FIGURE 3 is a view similar to FIGURE 2 and showing a modification.
Figure 4:
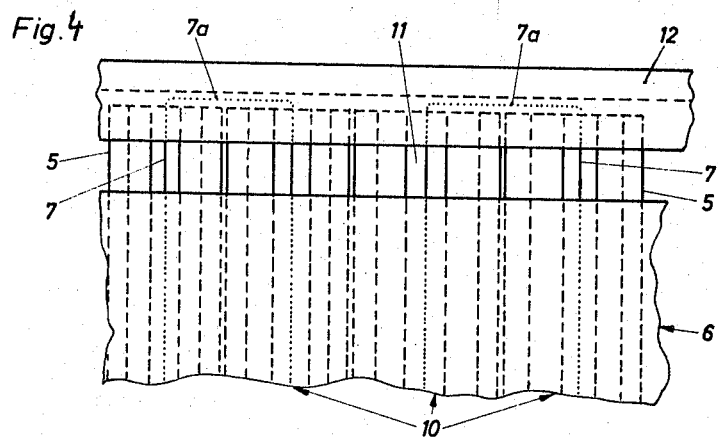
FIGURE 4 is a fragmentary view of a cabinet according to FIGURE 3 and taken in the direction of the arrow III.

In the example according to FIGURES 3 and 4 there is shown a round perspiration cabinet whose cabinet walls consist of vertical and adjacent arranged staves 5 which are connected with each other through a common flexible support designated at 6. In this example the heat conductors 7 are associated with the bars 5. These heat conductors 7 are in the designated embodiment constructed as electrical heating wires which are enveloped by a heat resistant plastic material, for example, a silicon or an epoxy resin.

The inner surface of the support 6 constitutes a layer 8 which consists of a strong heat emitting material, for example, a plastic sheet. The support 6 includes a further sheet 9 which is constructed from a good heat conductive material, for example, the already mentioned metal foil.

The heat conductors 7 are protected in grooves 10 in the inner side of the staves 5. In order to protect the user against unpleasant contact with the heated wall, each groove 10 is provided with a heat reflecting surface. This is accomplished in an especially simple manner in that the sheet 9 of the support 6 consists of a good heat conductive and similarly heat reflecting material which extends behind the conductor 7 in the region of the groove 10. The sheet or layer 8 extends in front of the conductors 7 in the region of the grooves 10. For example, the sheet 9 can be made out of textile material and on the innerside of which a very thin metal layer particularly an aluminum layer is provided. The textile material confers upon the support of the necessary firmness and makes certain a safe and firm binding of the staves 5 with each other. The layer 8 is glued to the metal layer, said layer 8 consisting of a strong heat emitting material.

The grooves 10 comprise together with the inner layer 8, the supporting channel in which the heat conductors 7 are located. In the illustrated embodiment these channels communicate through the upper passageways 11 and the lower passageways (not shown) with the interior of the cabinet. In this way there is provided a chimney effect which brings about a withdrawal of cool air in the region of the seating device 4 and conduction of the heated air in the upper zone of the cabinet. The circulation resulting from the chimney effect mixes the air in the interior of the cabinet and helps to bring about uniform heating thereof. The passageways by which channels 10 communicate with the interior of the cabinet can be provided in a simple manner, namely by terminating the support unit 6 at points spaced from the ends of the staves 5.

In order to minimize the outward flow of heat, the staves are made from a poorly heat-conductive material such as a plastic. Each stave can further possess a flat tubular cross section sub-divided by internal flanges. The heat transfer through these air filled staves is extremely small. Sub-dividing by means of such flanges has thereby not only the purpose of strengthening the staves 5 but of simultaneously minimizing the development of heat transferring convection currents.

At each of the upper and lower ends of the staves 5, there is located an annular rim 12 of U-shaped cross section embracing the ends of the staves 5 which rims consist of elastic, electrically insulative material. Along the inner portion of the U-shaped rims 12 extend heat conductive segments 7a which electrically connect the heat conductors 7 arranged along the several staves 5 with each other. The heat conductors 7 and 7a are electrically energized by a connecting cable 13 and a plug 14.

Figure 6:
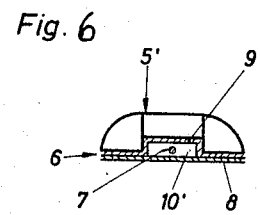
FIGURE 6 is a view similar to FIGURE 5 and showing a still further modification.
Figure 5:
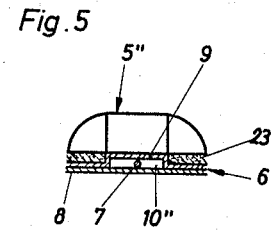
FIGURE 5 is a view similar to a portion of FIGURE 3 and showing a further modification.

In the embodiment according to FIGURES 3 and 4, the grooves 10 are provided by depression of the inner surface of the staves 5. In the embodiments of FIGURES 5 and 6, the heat conductor containing grooves are constructed differently. In the segment 5' of FIGURE 6 a part of the inner wall of the stave 5' is drawn backward between the flanges so that in cross section there is provided a rectangular groove 10'. In the embodiment of FIGURE 5, the stave 5" has a planar innerside to which the support 6 is glued between spaced adhesive filter strips 23. Between the strips 23 there is provided in this manner a groove 10 of essentially rectangular cross section.

It is possible to build the heat conductors in the shape of bands and to apply the heat conductors to the staves by pressure methods such as through vapor-condensation or spraying. It is further possible to arrange the heat conductors in the closed hollow spaces of the staves where they are still better protected against interplay with the ambient medium. Such a construction is shown in FIGURE 7. In this figure there is a stave construction provided from plastic which stave includes a chamber 21 which faces inwardly of the cabinet and houses a heat conductor 7 which stave further includes an outwardly arranged chamber 22. It is not completely necessary that a heat conductor be included in each stave and particularly if a good heat conductive layer is included in the support layer 6 (FIGURE 3), it is sufficient to provide a heat conductor in each second stave.

The perspiration cabinet of the invention renders certain, in a simple construction, a uniform and rapid heating of the cabinet wherein the energy required in use is extremely limited as compared to previous perspiration cabinets. In this connection, there is to be noted that in contrast to the cabinets having separately radiant heating apparatus which were known up to this time, the heating of the cabinet walls in the present apparatus makes available a large heating surface. In this manner it is made possible that the user of the perspiration cabinet is in no danger at all and also the cabinet can be collapsed and stored away in a minimum space.

Figure 8:
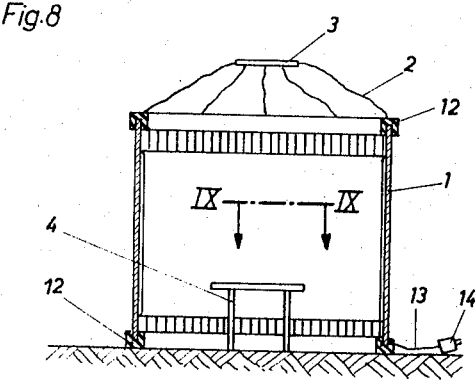
FIGURE 8 is a vertical central section through a further modification of the perspiration cabinet.

In a similar manner, the perspiration cabinet of FIGURE 8 is advantageous. This differs from the above-described embodiments of the invention in the particular construction of its heating portion which provides heat in an especially simple but nevertheless fully uniform manner.

Figure 9:
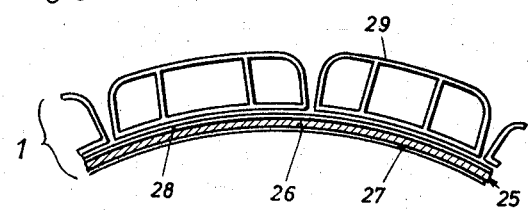
FIGURE 9 is a fragmentary enlarged horizontal section through the cabinet wall on line IX—IX of FIGURE 8.

In FIGURE 9 there is set forth an enlarged horizontal sectional view through the wall 1 of the cabinet of FIGURE 8. In this example, the cabinet wall extends all around the interior of the cabinet and is provided with a closed surface. The cabinet wall includes a heating sheet generally indicated at 25 to the outer surface of which are affixed hollow staves 29 formed of plastic material. The heating sheet 25 consists of an electric conductive layer 26 made from graphite or other relatively poor electrical conductor whose inner and outer sides are covered with the flexible palstic layers 27 and 28, respectively. The heating sheet 25 is arranged on the inner side of the cabinet wall.

In the use of the heating apparatus, an electrical potential is applied to the poorly conductive layer 26 and warms the same uniformly. The heat of the conductive layer 26 is imparted to the plastic layer 27 comprising the inner surface of the cabinet and will radiate from this plastic layer 27 into the cabinet interior. Since plastic radiates similarly to a black body, this radiation is intensive. Further, the layer 27 can be made dark in color in order to improve the emission still further. The exterior side of the heating sheet 25 serves in the embodiment of FIGURE 9 not only as a resistor insulating device but simultaneously as a load carrying segment for bringing and holding together the plastic hollow staves 29. Said plastic hollow staves 29 provide a heat insulating outer surface for the cabinet wall 1. The staves 29 are parallel and are closely spaced to each other. The inner surfaces of the staves 29 parallel and are affixed to the outer side of the plastic layer 28 as by gluing or welding. The plastic layer 28 together with the plastic hollow staves 29 provides a heat insulative casing as above described which holds to a very small value the heat lost through heat transfer from the cabinet interior. Although the heating sheet 25 is made very thin in order to hold its heat retaining capacity at a minimum, the plastic layers 27 and 28 should be sufficiently wear resistant at their outer sides so they can serve not only as a heat layer for the uniform warming of the interior of the cabinet but so that they can also serve simultaneously as a carrying layer for a proper location of the plastic hollow staves 29. It has been found that with the surface heating immediately above described, a person within the cabinet can be warmed to a temperature necessary for a breaking out of perspiration with a relatively low temperature in the heating sheet 25.

Figure 10:
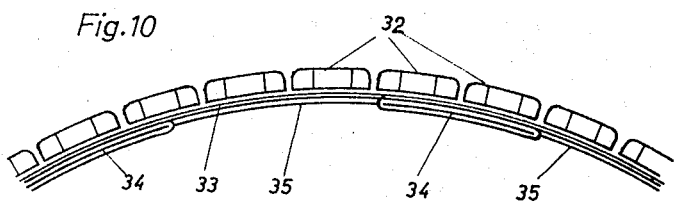
FIGURE 10 is a reduced view similar to FIGURE 9 and showing a modification thereof.

FIGURE 10 illustrates a horizontal section of a cabinet wall according to another embodiment of the invention. The heat insulative outer jacket of the cabinet wall is constructed from narrow hollow plastic staves 32 which lie adjacent each other and which extend vertically. Said hollow staves 32 have substantially planar surfaces facing toward the cabinet interior which are fastened by any convenient means to a plastic layer 33, for example, by being welded thereto. The plastic layer 33 holds the hollow staves 32 together and acts simultaneously as supplemental heat insulation. The plastic layer 33 is fastened by any convenient means, such as by gluing, to the outer surface of circumferentially spaced heating strips 34 which run in a vertical direction and are arranged parallel to each other. The basic construction of these heating strips 34 corresponds to the construction of the heating sheet 25 described hereinabove with respect to FIGURE 9. Thus, each heating strip 34 comprises a resistance heating layer covered on both sides with a plastic layer. In addition, the lateral edges of the heating strips 34 are insulated by plastic, for example, by welding, extending the lateral edges of the covering plastic layers past the edges of the resistance heating layer and welding the extended plastic edge portions together to sheath the resistance heating layer. The faces of the cabinet wall which are not covered by the heat layer strips 34 are covered with a very thin metal layer 35. The metal layer 35 has on its side facing toward the interior of the cabinet a highly reflective surface and is affixed, for example, glued, to the plastic layer 33.

The upper and lower ends of the hollow plastic staves 32 are covered by plastic U-section rims 12 above described with respect to FIGURE 1. Conductors for supplying current to the resistance heating layers of the heating strips 34 can be disposed in the grooves of the rims 12 so as to be outwardly invisible and well protected.

In this embodiment, the width of the heating strips 34 is so chosen that the heat flowing from the heating strips 34 is sufficient to warm a person located in the cabinet to the temperature necessary to bring about perspiration. The heating strips 34 and the metal reflecting layers 35 are alternately placed around the inner surface of the cabinet wall.

It is possible to replace the cross-sectional form of the hollow plastic staves 29 and 32 by hollow sections having other cross sections. These cross sections must nevertheless be so chosen that they can be effectively applied to the periphery of the cabinet and possess good heat insulating properties. Further, it is, for example, possible to provide, instead of a construction out of hollow plastic sections, a heat insulating outer jacket for the cabinet wall out of one or more layers of insulating material defining no chambers or cavities therebetween. FIGURE 11 illustrates such a perspiration cabinet which appears in rectangular form. A heating sheet 25 is arranged on the inner side of the cabinet wall and serves as a carrier for the insulative plates 36 which plates may be, for example, made out of strong cardboard. The cabinet opens at the corner 37. The cabinet can be collapsed by laying the plates 36 flat against each other. The heating sheet 25 in this arrangement serves as a hinge between the several plates 36.

FIGURE 12 illustrates the cabinet in a position of use and indicates at 38 a bar which serves to hold the cabinet closed by releasably joining, in any convenient way, the ends of the cabinet wall 1.

Although a particular preferred embodiment of the invention has been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. In a portable perspiration apparatus, a collapsible cabinet side wall comprising:
   a plurality of vertical, spaced apart, heat insulative staves;
   sheet means for hingedly fastening together such staves in side-by-side relation, said sheet means comprising inner and outer layers of flexible sheet material and a substantially continuous flexible layer of electrically conductive, heat generating, material therebetween, said layers being bonded together.

2. The device defined in claim 1 wherein said flexible sheet material comprises flexible plastic sheet material.

3. The device defined in claim 2 wherein the one of said plastic layers which faces inwardly is dark in color to improve its capacity for radiation.

4. A device defined in claim 2 in which said plastic is a silicone.

5. A device defined in the perspiration apparatus according to claim 2 in which said plastic is epoxy resin.

6. A perspiration apparatus according to claim 1 in which said electrically conductive layer has a relatively high electrical resistance.

7. The device defined in claim 1 wherein said staves are hollow.

8. Perspiration apparatus as defined in claim 1 wherein said insulating layer comprises a plurality of hingedly connected insulative wall units.

9. Perspiration apparatus as defined in claim 1 wherein said sheet means forms a hinge hingedly connecting said insulative wall units together.

10. Perspiration apparatus as defined in claim 1 wherein each insulative wall unit comprises a plurality of panels of heat insulating material.

References Cited by the Examiner

UNITED STATES PATENTS

| | | | |
|---|---|---|---|
| 1,120,224 | 12/1914 | Murray | 128—374 |
| 1,917,629 | 7/1933 | Anderson | 128—374 |
| 2,489,643 | 11/1949 | Hunter | 219—549 X |
| 2,543,937 | 3/1951 | Reynolds | 128—374 |
| 2,655,155 | 10/1953 | Achner | 128—374 |
| 2,680,800 | 6/1954 | Chandler | 219—549 X |

FOREIGN PATENTS

| | | |
|---|---|---|
| 839,539 | 5/1952 | Germany. |
| 1,089,092 | 4/1959 | Germany. |

ANTHONY BARTIS, *Primary Examiner.*

RICHARD M. WOOD, *Examiner.*

R. F. STAUBLY, *Assistant Examiner.*